Jan. 3, 1956
A. J. HUCK ET AL
2,729,159
COFFEE MAKER
Filed July 1, 1950
2 Sheets-Sheet 1
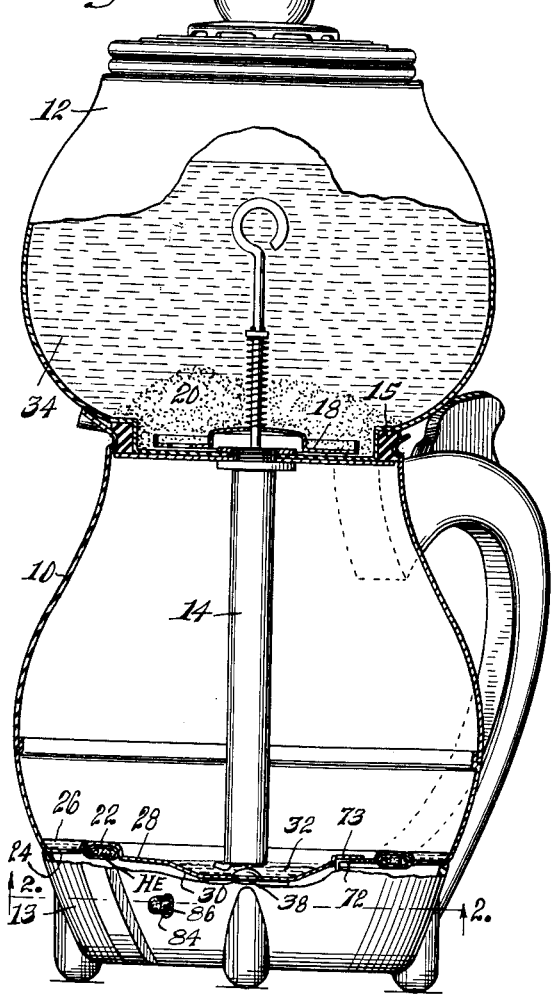
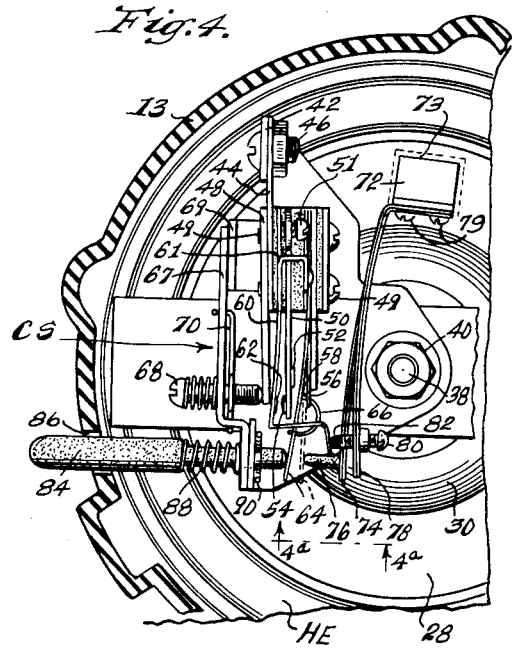
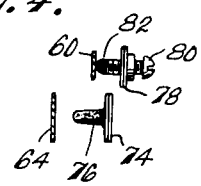
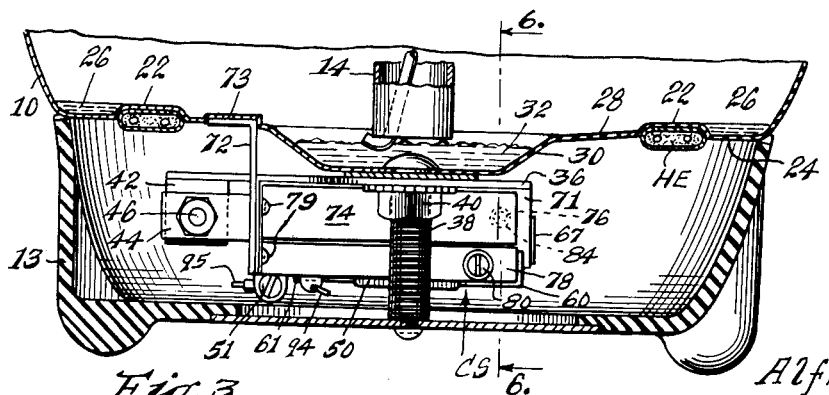
Inventors.
Alfred J. Huck,
And Israel Pass.
By Bair, Freeman & Molinare
Att'ys.

Jan. 3, 1956
A. J. HUCK ET AL
2,729,159
COFFEE MAKER
Filed July 1, 1950
2 Sheets-Sheet 2
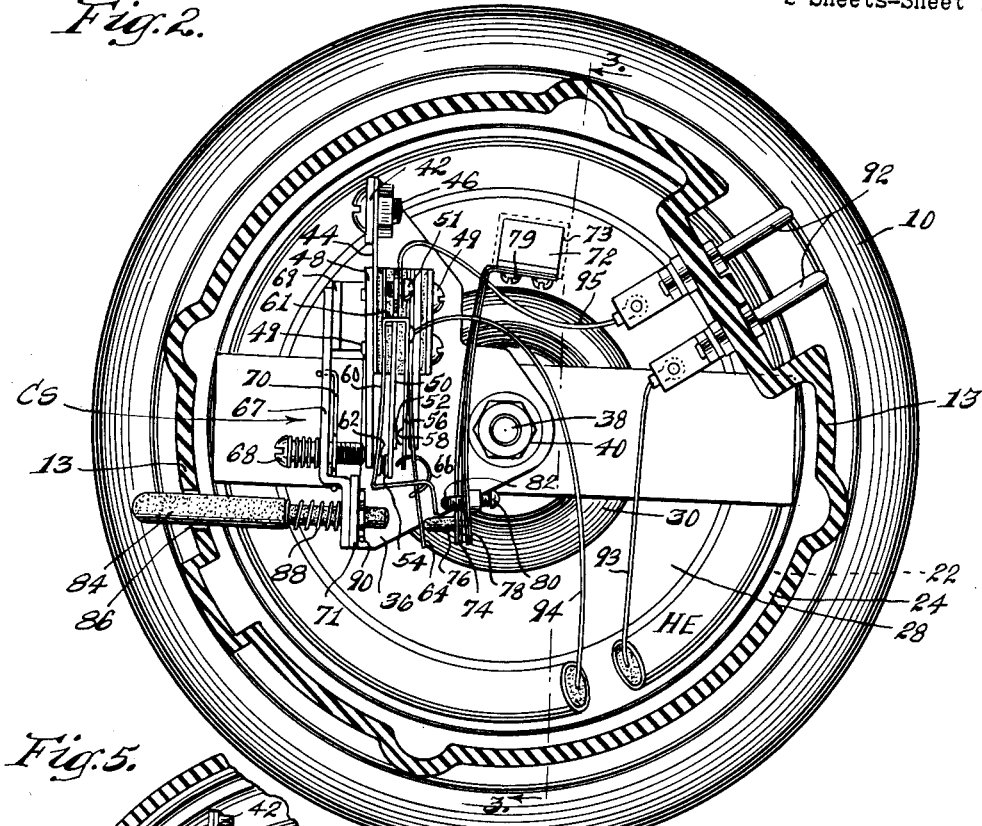
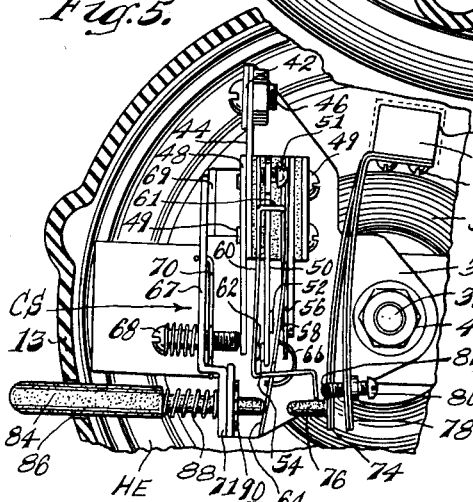
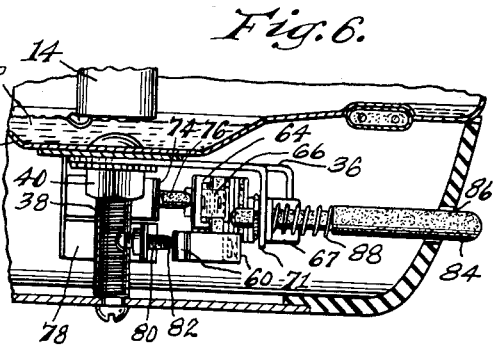
Inventors.
Alfred J. Huck.
And Israel Pass.
By Bair, Freeman & Molinare
Att'ys.

United States Patent Office 2,729,159
Patented Jan. 3, 1956

2,729,159

COFFEE MAKER

Alfred J. Huck and Israel Pass, St. Louis, Mo., assignors to Knapp-Monarch Company, St. Louis, Mo., a corporation of Delaware Application July 1, 1950, Serial No. 171,711

4 Claims. (Cl. 99—281)

This invention relates to a coffee maker or the like of the vacuum type designed to effect a desirable sequence of operations and automatic timing of such operations to result in producing properly brewed coffee each time the coffee maker is used.

One object of the invention is to provide a thermostatic control with a double switching arrangement wherein a main switch operates to initially cut off the heating element after the water has boiled in the lower bowl and has thereby been displaced into the upper bowl, a secondary control switch being thereafter operable to energize the heating element only sufficiently to keep the brew at proper drinking temperature.

Another object is to provide a lower bowl construction and particularly the bottom thereof designed in such manner as to conduct heat to the thermostatic switch properly for causing a desired timing operation thereof in relation to the transfer of water and brew between the upper and lower bowls during the coffee making operation.

Still another object is to provide a bottom construction for the lower bowl of a vacuum type coffee maker which provides a ring of water around the outer edge and a small quantity of water in a depressed portion at the center of the bowl bottom, with the heating element located just inside the outer ring of water and a thermostatic switch taking temperature from a sloping bottom portion extending from the heating element to said depressed portion which is located beneath the water transfer tube of the coffee maker.

With these and other objects in view, our invention consists in the construction, arrangement and combination of the various parts of our coffee maker, whereby the objects contemplated are attained, as hereinafter more fully set forth, pointed out in our claims and illustrated in the accompanying drawings, wherein:

Figure 1 is a side elevation of a coffee maker with our present invention applied thereto, a portion of the coffee maker being broken away and some of the remaining portions shown in section.

Figure 2 is an enlarged sectional view on the line 2—2 of Figure 1 and shows a bottom plan view of a control switch for the coffee maker, the parts being in normal position as when starting to operate the coffee maker.

Figure 3 is an enlarged sectional view on the line 3—3 of Figure 1 showing a rear elevation of the control switch.

Figure 4 is a bottom plan view of the control switch similar to Figure 2 showing the parts in a different position for effecting a heating element de-energizing control function.

Figure 4a is a sectional view on the line 4a—4a of Figure 4 showing the position of a pair of bimetal elements and the switch blades they actuate when the parts are in the position of Figure 4.

Figure 5 is a view similar to Figure 4 showing the parts in still another position.

Figure 5a is a view similar to Figure 4a showing the parts in the position corresponding to Figure 5; and Figure 6 is a sectional view on the line 6—6 of Figure 3 showing an end elevation of the control switch.

On the accompanying drawings we have used the reference numeral 10 to indicate the lower bowl of a vacuum type coffee maker and 12 to indicate the upper bowl thereof. A supporting base 13 of insulation is provided in the usual manner on which the lower bowl rests and the upper bowl is supported by the lower bowl with a gasket connection between the two as usual in coffee makers of this type.

The upper bowl 12 includes a transfer tube 14 depending from the bottom thereof and a cover 16 is provided for the upper bowl. A filter 18 such as shown in the copending application of Alfred J. Huck, Serial No. 144,937, filed February 18, 1950, is provided on which the ground coffee 20 is deposited for the purpose of the coffee making operation.

The bottom of the lower bowl 10 has a raised annular bead 22 for a C-shaped tubular heating element HE and outside of this bead the bottom forms an annular trough or depression 24 for water 26, the specific purpose of which construction will be disclosed hereinafter. Inside the annular bead 22, the bottom of the lower bowl slopes downwardly toward the center as indicated at 28 and terminates in a central depression 30 immediately under the lower end of the transfer tube 14. This depression is illustrated with a quantity of water 32 therein for the purpose of describing the operation of our construction in the following specification, the coffee maker being shown in Figure 1 at that stage in the coffee making operation when the water has been boiled and displaced through the transfer tube 14 into the upper bowl 12 as indicated at 34.

The control switch which we provide is indicated generally by the reference character CS and comprises the elements bearing reference numerals 36 to 90 as will now be described.

A base plate 36 is provided on which the remaining elements of the control switch are mounted. This base plate is secured to the bottom of the lower bowl 10 for support thereby by a nut 40 on a stud 38 that extends through a suitable perforation in the base plate 36. The stud may be secured to the bottom of the lower bowl 10 in any suitable manner such as by means of brazing or soldering.

The base plate 36 has an ear 42 thereon with which a heavy leaf spring 44 is connected by a bolt 46. An adjusting blade 48 is mounted on the leaf spring 44 by means of screws 49 which screws also mount insulating inserts and various control switches on the ear 42 as will hereinafter appear.

The control switch further includes a contact blade 50 which has an ear receiving a terminal screw 51 and the blade carries stationary contacts 52 and 54. A movable contact blade 56 is included which carries a contact 58 for cooperation with the contact 52. Another movable contact blade 60 is provided and the two blades 56 and 60 are electrically connected together by a connection shown at 61. The movable blade 60 carries a contact 62 for cooperation with the contact 54.

The control switch further includes an actuating spring blade 64 adapted to actuate the contact blade 56 through the medium of a C-shaped toggle leaf spring 66. A supporting bar 67 is spot-welded or otherwise suitably secured to ears 69 and 71 of the base plate 36 and an adjusting screw 68 is threaded therein. A lock wire 70 is provided for the adjusting screw and the purpose of the screw is to swing the control switch assembly thus far described toward or away from a pair of bimetal elements 74 and 78 for temperature adjusting purposes, the heavy spring blade 44 being biased to retain the adjusting blade 48 in contact with the adjusting screw 68.

The sloping portion 28 of the bottom of the lower bowl 10 has a raised depression 73 in which a heat conducting bracket 72 is soldered. The bimetal elements 74 and 78 are secured to the heat conducting bracket 72 by bolts 79. The bimetal blade 74 carries an insulating stud 76 for coacting with the actuating blade 64 at times and the bimetal element 78 carries an adjusting screw 80 provided with an insulating point 82 for coaction with the switch blade 60 at certain temperatures.

The contacts 52 and 58 are normally closed as in Figure 2 but may be opened by the bimetal blade 74 swinging the actuating blade 64 to the left as to the position shown in Figure 4, the parts assuming the dotted position shown therein at the time the toggle spring 66 is on dead center and immediately following which the toggle spring throws the actuating blade to the full-line position and the switch blade 56 to its full-line position with the contact 58 separated from the contact 52.

The switch when snapped to this position will not return to the closed position except by a manual resetting operation accomplished by a reset rod 84 projecting through a hole 86 in the supporting base 13 of the coffee maker and normally extended to the position shown in Figure 2 by a spring 88. The spring is on a reduced part of the rod which part slides through suitable openings in the bar 67 and the ear 71 and is provided with a key 90 inside the ear 71 to limit the outward extension of the reset rod.

The reduced inner end of the reset rod 84 is in alignment with the actuating blade 64 for the purpose of moving it from the position of Figure 4 back to the position of Figure 2 after the bimetal blade 74 has cooled sufficiently or entirely and it is desirable to make another batch of coffee.

The bimetal blade 78 is adapted to coact with the switch blade 60 for opening the contacts 54 and 62 when a predetermined temperature is exceeded and permits them to reclose when the temperature is less than the predetermined value.

The connection 61 between the switch blades 56 and 60, and the contacts 52 and 54 both being mounted on the blade 50, effects a connection of the switch contacts 52—58 and 54—62 in parallel with each other. Current supply prongs 92 are provided in the usual way for connection of a service cord thereto, and wires 93, 94 and 95 connect the prongs, the heating element HE and the switch blades together as obvious in Figure 2. Thus whenever the contacts 52 and 58 are open and 54 and 62 are also open, there is no current flow in the heating element. When either or both sets of contacts are closed, then the heating element is energized.

The arrangement disclosed provides a thermostatic switch to de-energize the heating element after the water has risen from the lower bowl to the upper bowl thus controlling the coffee making operation by virtue of the fact that the lower bowl then cools whereupon a vacuum is created therein about three minutes after both the switch contacts are open (the contacts 54—62 being opened at a slightly lower temperature or slightly ahead of the main or snap acting contacts 52—58 during operation of the coffee maker). The vacuum created draws the brewed coffee down through the filter 18 into the lower bowl to end the coffee making operation.

The control switch CS functions as follows: When the water rises into the upper bowl leaving only the ring of water 26 and the water at 32 in the lower bowl, the heating element HE increases the bowl bottom temperature rapidly which causes the bimetal elements 74 and 78 to rise sharply in temperature because of the heat conducted from the dry sloping bottom 28 and the upwardly depressed portion 73 thereof through the heat conducting bracket 72 to the anchored ends of the bimetal elements. The bimetal elements at that time are warped to approximately the position shown in Figure 4 and just prior to the solid-line position the actuating blade 64 is in a dead-center position shown by the dotted lines which as soon as passed will result in the toggle spring 66 snapping the contact 58 to the solid line position just after the contact 62 has been separated from the contact 54. This de-energizes the heating element at about a temperature of 285° F. in the bimetal as compared to about 220° F. therein when the water just rises into the upper bowl. The snap action, of course, opens the contacts 52 and 58 quickly to minimize arcing, and the over-center relationship of the parts then remains even when the bimetal elements cool as the toggle spring 66 is so related to the switch blade 56 and the actuating blade 64 that it takes a return movement of the blade 64 to close the switch again to its normal position as the insulating stud 76 makes only contact with the blade 64 and is not connected with it to return it when the bimetal blade 74 cools down.

Since both sets of contacts are now open, no heat is generated in the coffee maker during "brew time" and this being a critical period, any heat generated during this period would prevent rapid cooling of the lower bowl 10 and thus provide excessive brew time and a bitter brew taste.

About fifteen minutes after the end of the complete coffee making operation, however, the lower bowl 10 and the bimetal elements 74 and 78 cool sufficiently so that the brew (now in the lower bowl) needs supplementary heat to maintain it at serving temperature. This is accomplished by the bimetal blade 78 and the contacts 54 and 62 which may be referred to as a "keepswarm" switch. These contacts reclose at about 175° F. which provides an even heat of about that temperature for the brew in the lower bowl thus keeping it at a proper drinking temperature but at a lower temperature than necessary to cause the brew to again rise to the upper bowl which would be about 212° F.

With the disclosed arrangement, the bimetal blade 74 is used to actuate a wide differential "main switch" 52—58 to control the brewing operation and the bimetal blade 78 is used to control a small differential temperature limiting switch (contacts 54 and 62) to keep the brew warm.

In connection with successful operation of our control, the construction of the lower bowl 10 is of considerable importance. We have found that in some cases the temperature of the heat conductor bracket 72 rises too quickly after the water rises so that if the switch 52—58 were cut off when a tolerable increase in bimetal temperature occurs, the cut-out would come so quickly that the brewtime (or time for the water to again drop to the lower bowl measured starting from the time the water rises into the upper bowl) would be too short for adequate infusion of the ground coffee by the hot water. We have also found that with some constructions, the temperature of the insulating base 13 and the entire lower bowl temperature become too high during the interval after the water rises to the upper bowl.

We have provided a corrective measure for both problems by contouring the bottom of the lower bowl so that a predetermined quantity or ring of water 26 remains after the water rises into the upper bowl. This ring of water serves to delay the temperature rise in the rest of the bottom area for the desired interval (usually about one minute, which added to perhaps two or three minutes required for the water to drop after switch cut-out provides an ideal three to four minutes' brew time). This ring of water also serves to maintain a cool temperature in the base 13 and a cool lower bowl temperature. In actual operation with an 800 watt heating element, the ring of water "dries out" about 40 seconds after the water rises into the upper bowl, then permits an ideal 15 second or 20 second additional interval before the switch cuts off.

The sloping bottom 28 also has an important function in that the area at the heat conductor bracket 72 should definitely be "dry" immediately after the water rises. A slanted contour at that point to prevent any pools of water, and a dry upwardly depressed portion 72 near the heating element is required to serve this purpose. The depression 30 at the center is required to hold the small amount of water 32 for a time after the water rises to prevent "pumping" or the violent up and down movement of the water through the riser tube during the brew time. Such pumping is due to a completely dry bottom and is objectionable because its action is intermittent and during a pump action some water may remain in the lower bowl too long causing premature cooling of the lower bowl and consequent abnormally short brew time as the remainder of the brew follows it down to the lower bowl.

It is therefore evident that the annular depression 24, the sloping bottom 28, the upwardly depressed portion 73 and the bimetal responding to the temperature of 73 are important considerations in the automatic control of our coffee maker in order to produce properly brewed coffee.

Some changes may be made in the construction and arrangement of the parts of our coffee maker without departing from the real spirit and purpose of our invention, and it is our intention to cover by our claims any modified forms of structure or use of mechanical equivalents which may be reasonably included within their scope.

We claim as our invention:

1. An automatic coffee maker comprising a bottom bowl, a top bowl on the bottom bowl having a depending transfer tube, a circuit controlling switch, the switch comprising in combination, a flexible support arm secured to the lower bowl, adjustable means secured to the lower bowl adapted to flex the support, a snap acting switch carried by said support having a pair of relatively movable contact making members and an over-center spring mechanism operable to seal the members selectively in contact-making or contact-breaking relation, a uniformly acting switch carried by said support and having a pair of relatively movable contact-making members, a bimetallic arm means in thermal contact with the bottom of the lower bowl and operative to engage the switches sequentially to open the uniform acting switch and the snap acting switch in succession, adjustable means interposed between the bimetallic arm means and the uniform acting switch, manual reset means operable to force the snap acting switch to the contact-making condition to initiate coffee-making operations and means operable to heat the bottom bowl and energized through said switches in parallel.

2. A coffee maker comprising in combination, a lower bowl for water having a bottom, a heating element adapted to heat the bottom of said bowl, an upper bowl for coffee having a depending transfer tube, a flexible support arm secured to the bottom of said lower bowl, adjustable means secured to the lower bowl adapted to flex the support, a snap acting switch carried by said support having a pair of relatively movable contact making members and an over-center spring mechanism operable to seal the members selectively in contact making or contact breaking relation, a uniformly acting switch carried by said support and having a pair of relatively movable contact making members, bimetallic arm means in thermal contact with the bottom of the lower bowl and operative when heated to engage said switches sequentially to open the uniform acting switch and the snap acting switch in succession, adjustable means interposed between the uniform acting switch and the bimetallic arm means, manual reset means operable to force the snap acting switch to the contact making condition to initiate coffee making operations, and means defining an energizing circuit to the heater through the switches in parallel.

3. An improved lower bowl for a vacuum-type coffee maker, which bowl includes a bowl-defining member having upright bowl sides and a bottom; the improvement in said bowl wherein said bowl bottom comprises a central depressed well defined therein, said well including a well bottom and upright well side walls, an annular conical surface sloping upwardly from the periphery of the upper edge of said well side walls, a raised annular portion at the upper and outer peripheral edge of said conical surface, said raised annular portion merging into an annular depressed portion which is positioned outwardly of said raised annular portion and which is depressed below the uppermost level of said raised annular portion, the bottom wall of said annular depressed portion lying substantially at the level of the upper edge of said conical surface, said annular depressed portion then merging into said upright bowl sides; an annular heater secured to the underside of said bowl within said raised annular portion; and a thermostatic element secured to and responsive to the temperature of said conical portion of the bowl bottom at a point between the annular heater and said central well and being operative to control heating of said heater.

4. An improved lower bowl for a vacuum-type coffee maker, which bowl includes a bowl-defining member having upright bowl sides and a bottom; the improvement in said bowl wherein said bowl bottom comprises a central depressed well defined therein, said well including a well bottom and upright well side walls, an annular conical surface sloping upwardly from the periphery of the upper edge of said well side walls, a raised annular portion at the upper and outer peripheral edge of said conical surface, said raised annular portion merging into an annular depressed portion which is positioned outwardly of said raised annular portion and which is depressed below the uppermost level of said raised annular portion, the bottom wall of said annular depressed portion lying substantially at the level of the upper edge of said conical surface, said annular depressed portion then merging into said upright bowl sides; an annular heater secured to the underside of said bowl within said raised annular portion; and a thermostatic element secured to and responsive to the temperature of said conical portion of the bowl bottom at a point between the annular heater and said central well and being operative to control heating of said heater; and said annular depressed portion being of such a size and being so proportioned to the output of said heater as to contain therein, after the greater portion of the water in the bowl has been forced from the bowl and so that the conical portion of the bowl bottom is free of water thereabove, sufficient water to be evaporated by the heater in about 40 seconds.

References Cited in the file of this patent

UNITED STATES PATENTS

| | | |
|---|---|---|
| 1,994,323 | Peirce | Mar. 12, 1935 |
| 2,189,127 | Brannon | Feb. 6, 1940 |
| 2,223,450 | Jepson et al. | Dec. 3, 1940 |
| 2,262,286 | Ireland | Nov. 11, 1941 |
| 2,287,583 | Weeks | June 23, 1942 |
| 2,312,555 | Jepson | Mar. 2, 1943 |
| 2,356,784 | Graham | Aug. 29, 1944 |
| 2,365,615 | Woodman | Dec. 19, 1944 |
| 2,367,500 | Huck | Jan. 16, 1945 |
| 2,518,566 | Osterheld | Aug. 15, 1950 |
| 2,522,718 | Huck | Sept. 19, 1950 |
| 2,537,167 | Snyder | Jan. 9, 1951 |
| 2,552,420 | Frankel | May 8, 1951 |
| 2,577,985 | Willman | Dec. 11, 1951 |
| 2,690,709 | Farr et al. | Oct. 5, 1954 |